Oct. 22, 1963

G. J. GIEL 3,108,267

MULTIPLEXER SYSTEM

Filed Oct. 23, 1958

INVENTOR:
George J. Giel
By Smyth & Roston
Attorneys

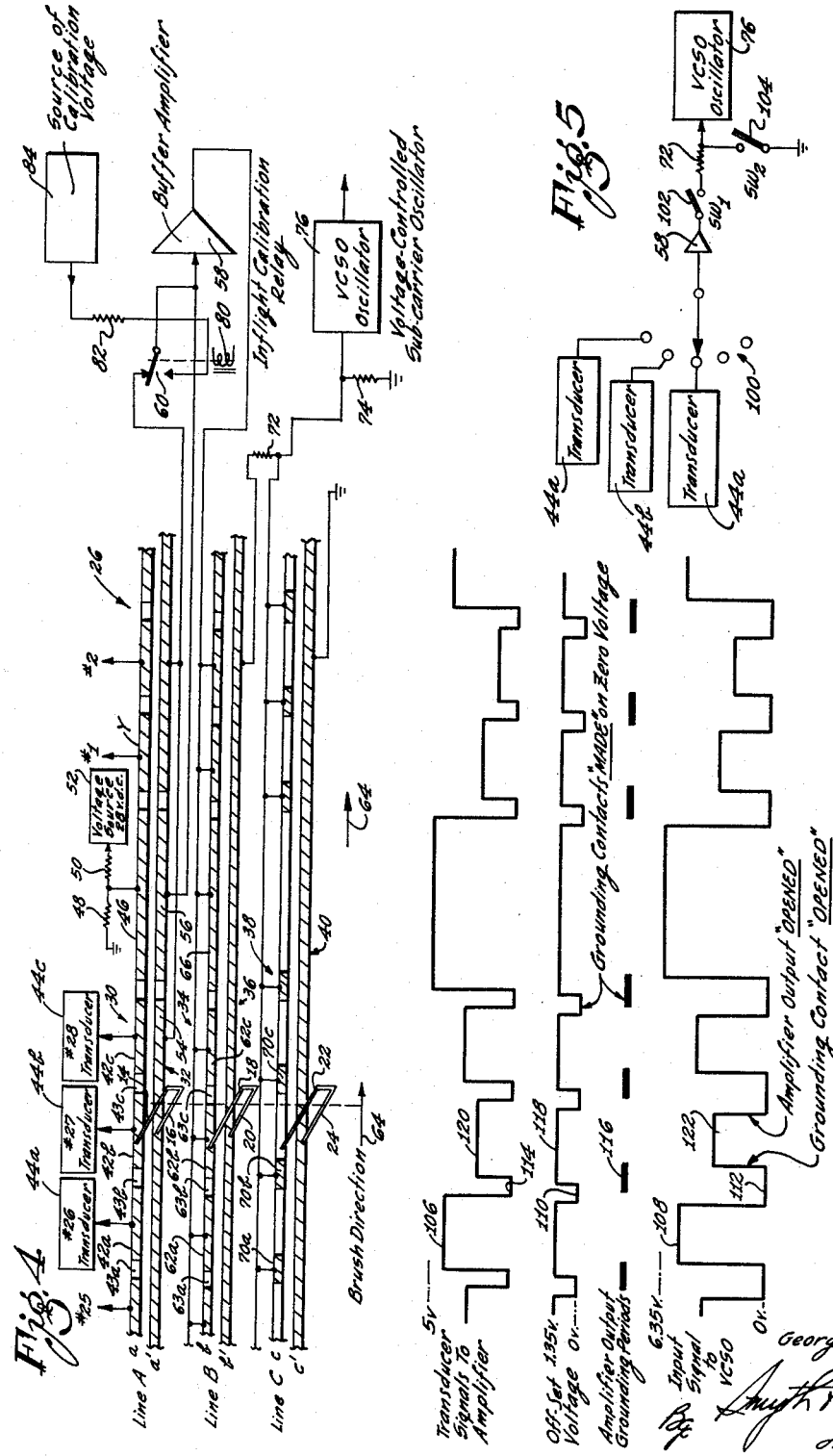

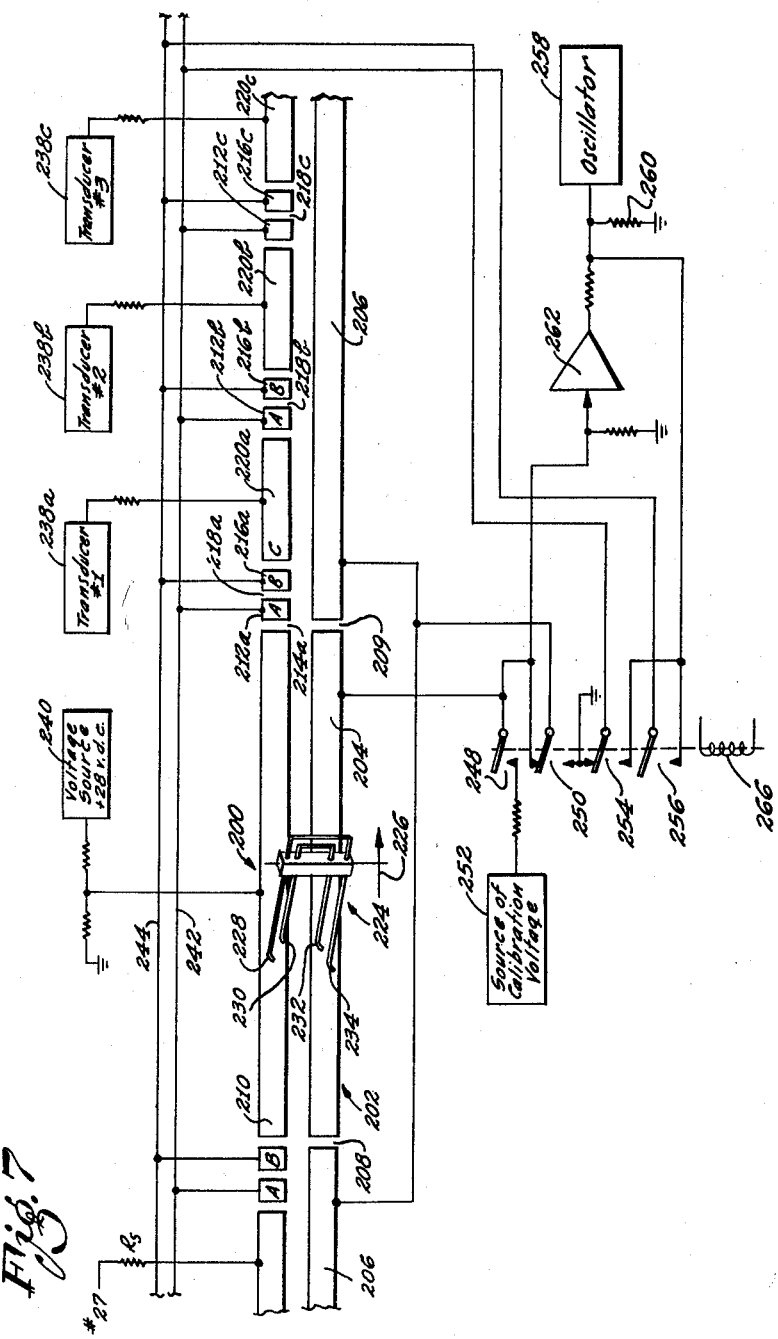

Oct. 22, 1963

G. J. GIEL 3,108,267

MULTIPLEXER SYSTEM

Filed Oct. 23, 1958

INVENTOR:
George J. Giel

By Smyth & Roston
Attorneys

United States Patent Office 3,108,267
Patented Oct. 22, 1963

3,108,267
MULTIPLEXER SYSTEM
George J. Giel, Los Angeles, Calif., assignor to Genisco, Incorporated, Los Angeles, Calif., a corporation
Filed Oct. 23, 1958, Ser. No. 769,181
1 Claim. (Cl. 340—364)

This invention relates to testing apparatus and more particularly to apparatus for sequentially sampling the signals from a plurality of different channels or transducers. The invention is especially adapted to be used in multiplexing operations in which a commutator is rotated to sequentially activate a plurality of different channels for the passage of information from the channels upon the activation.

In many types of systems now being used, a plurality of different parameters are introduced to the system to obtain a proper operation of the system. Each parameter may represent the output from a different transducer. For example, one parameter may represent the pressure of the air surrounding an aircraft at any instant; a second parameter may represent the ambient temperature in the vicinity of the aircraft; and a third parameter may represent the relative humidity around the aircraft. Each of these parameters may be represented by potentials having a level at any instant related to the value of the particular parameter such as ambient temperature, pressure or humidity. These potentials are introduced to a system which uses the potentials in a particular interrelationship dependent upon the control to be exerted by the system. For example, the potentials representing temperature, pressure and humidity may be used in a system for providing a refined control over air conditioning being produced in a room.

The potentials representing the different parameters such as ambient pressure, temperature and humidity are often sensed on a sequential basis in the different transducers which provide such potentials. This is obtained by providing a multiplexing switch having a plurality of contacts wherein each contact is associated with a different one of the transducers to obtain the introduction of a potential from the transducer when the contact is energized. One type of multiplexing switch now in use is formed by a disc and by a rotary member, such as a brush or wheel. In this type of multiplexing switch, successive contacts on the disc are activated as the brush or wheel moves past the contacts.

The multiplexing switches now in use have certain disadvantages. One important disadvantage results from the fact that switching contacts are closed to obtain a determination as to the potentials of the different parameters, such as pressure, temperature and humidity. Since each parameter is tested upon the closure of switching contacts, errors in the determination of these potentials may be produced as a result of chatter and bouncing of the switching contacts. Such chatter and bouncing of the switching contacts affects the impedance of the testing circuitry and accordingly produces variations in the potential which is effectively presented to the output stages.

Various attempts have been made to eliminate the effects resulting from the chatter and bouncing of the switching contacts. However, such attempts have not been entirely successful or have resulted in somewhat complex equipment. For example, electronic circuitry has been included to prevent any test from being made as to the value of each parameter until after any transient effects resulting from the closure of switch contacts has been eliminated. Such electronic circuitry has been disadvantageous among other reasons because of its complexity.

This invention provides a multiplexing system which overcomes the disadvantages inherent in the previous multiplexing systems. The invention includes a disc having at least a pair of annular tracks. One of the tracks is provided with a continuously conductive configuration, and the other track is provided with a plurality of arcuate segments, each electrically isolated from the adjacent conductive segments in the track. A testing member such as a wheel or a plurality of ganged brushes is rotatable along the annular tracks to activate successive positions along the tracks.

In the multiplexing system constituting this invention, the tracks on the disc are electrically associated with one another so that a short circuit is produced at the input to the output stage during the time that a transition is being made between the testing of each successive pair of parameters. For example, a short circuit is produced at the end of the test for the value of the parameter representing pressure and until the beginning of the test for the value of the parameter representing temperature. By providing such a short circuit during this time, transient effects resulting from the breaking and making of switching contacts are eliminated. By way of illustration, the short circuit is eliminated when the transient effects at the beginning of the test for the potential representing temperature have disappeared.

In the preferred embodiment of the invention, a plurality of tracks are provided on the disc. The conductive segments on particular ones of the tracks in the plurality are so arranged that the line to the input terminal of the output stage first becomes opened at the end of a particular determination, such as for the parameter representing pressure. A low impedance path to ground is then provided at the input terminal to the output stage, and the line to the input terminal of the output stage subsequently becomes closed. The closing of this line now has no effect on the introduction of a potential to the output stage since the input to the output stage has previously become short circuited to ground.

The circuitry to the transducer indicating the next parameter such as temperature then becomes closed. This too has no effect on the operation of the output stage because of the short circuit imposed on the input to the output stage. After the transient conditions resulting from the transition between the testing of the first parameter such as pressure and the second parameter such as temperature have disappeared, the short circuit to ground at the input terminal to the output stage is removed. This prepares the output stage for a test as to the potential representing the value of the second parameter such as temperature. This test can be made immediately without the occurrence of any undesirable transient conditions.

In the drawings:

FIGURE 4 is an enlarged, fragmentary, developed view of the tracks shown in FIGURE 3 and particularly illustrates the relative disposition of the conductive segments in the different tracks and further illustrates various electrical circuitry associated with the different tracks to obtain a desired test of different parameters on a multiplexing basis;

FIGURE 5 is a circuit diagram somewhat schematically illustrating on a simplified basis the operation of the disc and associated brushes and the electrical circuitry shown in FIGURE 4;

FIGURE 6 illustrates curves representing potentials produced at the strategic terminals in the circuitry shown in FIGURE 4 at successive intervals of time, the curves shown in FIGURE 6 being drawn to the same scale as the tracks in FIGURE 4 and in aligned relationship to the tracks for correlation between the signals produced on the different tracks with the curves shown in FIGURE 6;

FIGURE 7 is a developed view somewhat similar to that shown in FIGURE 4 and illustrates the construction of different tracks on a disc and of brushes coupled to the track and further illustrates electrical circuitry associated with the different tracks to obtain a desired test of different parameters on a multiplexing basis;

Figure 1:
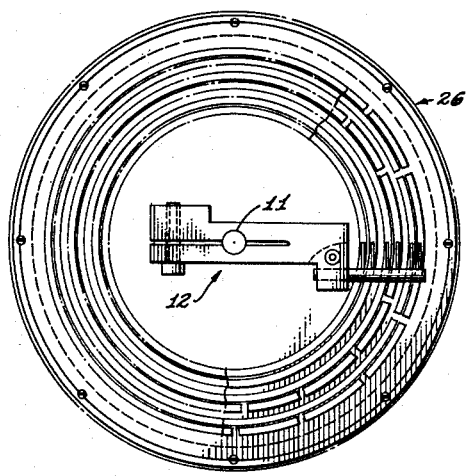
FIGURE 1 is a front elevational view of apparatus included in one embodiment of the invention and shows a disc having a plurality of annular conductive tracks and further shows a brush holder which is rotatable relative to the disc and which is provided with a plurality of brushes disposed in coupled relationship to the tracks on the disc.
Figure 2:
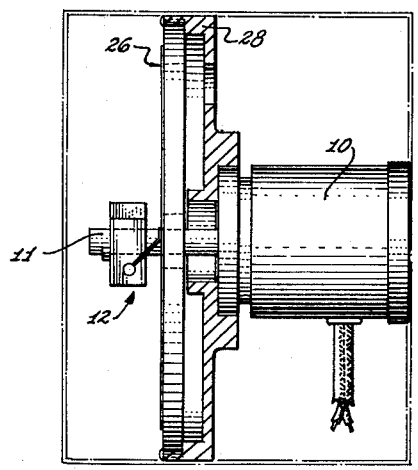
FIGURE 2 is a sectional view of the disc and the brush holder shown in FIGURE 1 and further illustrates a motor for driving the brush holder and a plate for mounting the disc in fixed position.
Figure 3:
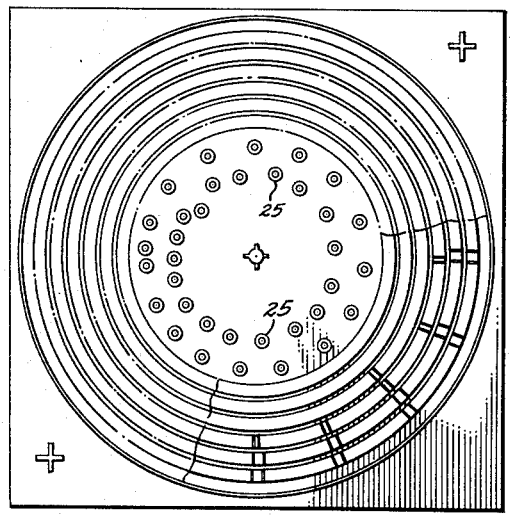
FIGURE 3 is a front elevational view of the disc shown in FIGURE 1 and particularly illustrates the relative disposition of the different conductive tracks on the disc and further illustrates on a fragmentary basis the relative disposition of the conductive segments in the different tracks.

In the preferred embodiment of the invention shown in FIGURES 1 to 4, inclusive, a motor 10 (FIGURE 2) is adapted to rotate a brush assembly generally indicated at 12 (FIGURES 1 and 2), the brush assembly being mounted on a shaft 11. The brush assembly 12 is constructed to hold a plurality of brushes 14, 16, 18, 20, 22 and 24 (FIGURE 4), all of which may be made from a suitable material having hardened properties, such as platinum. For example, the material for the brushes 14, 16, 18, 20, 22 and 24 may be that designated as "Palney 7" by the Ney Metal Company of Hartford, Connecticut. The brushes 14, 16, 18, 20, 22 and 24 may be constructed in a manner to provide point contacts with the different rings in a disc, generally indicated at 26. The brushes 14 and 16, the brushes 18 and 20 and the brushes 22 and 24 may be directly coupled electrically to each other.

An annular mounting plate 28 is supported on the shaft 11 for fixed positioning even during the rotary movements of the shaft. The mounting plate 28 in turn holds the disc 26 such that the disc is maintained in contiguous relationship to the brushes 14, 16, 18, 20, 22 and 24 while the brushes are rotating. The disc 26 may be made from a suitable plastic material having thermo-setting properties. A plurality of terminals 25 (FIGURE 3) may be disposed on the disc to facilitate the different electrical connections which will be described in detail subsequently.

A plurality of annular tracks generally indicated at 30, 32, 34, 36, 38 and 40 in FIGURE 4 are disposed on the disc 26 in spaced and concentric relationship to one another. Each of the tracks, 30, 32, 34, 36, 38 and 40 may be formed from a conductive material such as rhodium so as to have hard properties for resisting wear as the brushes revolve around the tracks. The tracks 30, 32, 34, 36, 38 and 40 may be disposed on the disc 26 in flush relationship to the surface of the disc and may be provided with widths of approximately one-sixteenth of an inch. The radius of the inner track may be in the order of approximately one inch, and the radius of the outer track may be in the order of one and three-fourths inches, with a spacing of approximately one-thirty-second of an inch between adjacent tracks.

The track 40 may be the innermost of the tracks in the plurality and may be provided with a continuous configuration. The track 36 may be disposed in contiguous relation to the track 40 and may also be provided with a continuous configuration. As will be described in detail subsequently, each of the other tracks is provided with at least a pair of arcuate conductive segments or portions which are disposed in electrically isolated relationship to one another.

The track 30 may be disposed as the fourth track from the center of the disc 26 and may be provided with a plurality of conductive segments 42a, 42b, 42c, etc., all preferably having substantially equal lengths of arcuate configuration. Each of the arcuate segments 42a, 42b, 42c, etc., is connected to receive the potential from the different transducer. For example, the segment 42a is connected to receive the potential from a transducer 44a in representation of a first parameter such as pressure; the segment 42b is connected to a transducer 44b to receive a potential representing at any instant the value of a second parameter such as temperature; and the segment 42c is connected to receive the potential from a transducer 44c in representation of the value of a third parameter such as humidity. Each of the segments 42a, 42b, 42c, etc. is separated from the adjacent segments by electrically insulated portions 43a, 43b, 43c, etc. of relatively short arcuate length.

A conductive segment 46 is also preferably disposed in the track 30 in electrically isolated relationship to the other conductive segments such as the segments 42a, 42b and 42c. The segment 46 is provided with an arcuate configuration and is preferably provided with a length exceeding that of the segments 42a, 42b, 42c, etc. As will be described in detail subsequently, the segment 46 is included to obtain the production of a synchronizing pulse in each revolution of the brush holder 12. The segment 46 is connected to first terminals of a pair of resistances 48 and 50. The second terminal of the resistance 48 is disposed electrically to receive a reference potential such as ground, and the second terminal of the resistance 50 is connected to receive a direct potential such as 28 volts from a voltage source 52.

The track 32 is preferably disposed as the third track from the center of the disc 26. The track 32 is provided with a pair of conductive segments 54 and 56 which are disposed in electrically isolated relationship to each other. The conductive segment 56 is provided with an arcuate length corresponding to that of the segment 46 in the track 30 and is disposed in radially aligned relationship with the segment 46. The segment 56 is separated from the segment 54 by an arcuate distance corresponding to the separation between the segments 42c and 46. The segment 56 is connected to the input terminal of a buffer amplifier 58 which is shown in block form since it may be constructed in a conventional manner. A connection is made from the segment 54 to the upper stationary contact in FIGURE 4 of a single-pole, double-throw switch 60.

The track 34 is preferably disposed as the fifth track from the center of the disc 26. The track 34 is provided with first conductive segments 62a, 62b, 62c, etc. The segments 62a, 62b, 62c, etc., have arcuate lengths corresponding to those of the segments 42a, 42b, 42c, etc., and have insulated spacings 63a, 63b, 63c, etc. corresponding to the spacings 43a, 43b, 43c, etc. provided between the segments 42a, 42b, 42c, etc. The conductive segments 62a, 62b, 62c, etc., have a disposition in front of the segments 42a, 42b, 42c, etc., in the direction of rotation of the brushes 14, 16, 18, 20, 22 and 24. The direction of rotation of these brushes is indicated in FIGURE 4 by an arrow 64 as occurring toward the right in that figure.

As will be seen in FIGURE 4, the segments 62a, 62b, 62c, etc., are displaced only slightly in front of the corresponding segments 42a, 42b, 42c, etc. This displacement is such that the insulated spacings 43a, 43b, 43c, etc. in the track 30 are presented to the brushes before the end of the corresponding insulated spacings 63a, 63b, 63c, etc. in the track 34. The reasons for this will be described in detail subsequently. In addition to the conductive segments 62a, 62b, 62c, etc., the track 34 is provided with a conductive segment 66 having an arcuate length corresponding to that of the arcuate segment 46 in the track 30. The segment 66 in the track 34 is displaced ahead of the segment 46 in the track 30 in the direction of rotation of the brush holder 12 by a distance corresponding to the displacement between the segments 42a, 42b, 42c, etc., and the segments 62a, 62b, 62c, etc. All of the segments 62a, 62b, 62c, etc., and the segment 66 are connected to the output terminal of the buffer amplifier 58.

The track 38 is preferably the outermost track on the disc 26. The track 38 is provided with a plurality of segments 70a, 70b, 70c, etc., each of which has a relatively short arcuate length and each of which is separated by a relatively great arcuate distance from the adjacent segments in the track 38. Preferably the segments 70a, 70b, 70c, etc., have equal length which are slightly greater than the lengths of the insulated portions 43a, 43b, 43c, etc., and 63a, 63b, 63c, etc. The segments 70a, 70b, 70c, etc., are disposed in the track 38 so as to angularly straddle the corresponding isolated portions 43a, 43b, 43c, etc., in the track 30. However, the leading edges of the segments 70a, 70b, 70c, etc., in the track 38 are disposed slightly behind the leading edges of the corresponding isolated portions 63a, 63b, 63c, etc., in the track 34, as seen from the direction of rotation of the brush holder 12.

The single conductive segment in the track 40 is connected to a suitable reference potential such as ground, and the single conductive segment in the track 36 is connected to a first terminal of a resistance 72. A connection is made to the second terminal of the resistance 72 from the conductive segments 70a, 70b, 70c, etc., in the track 38. The potential on the second terminal of the resistance 72 is introduced to a first terminal of a resistance 74 having its second terminal connected to the reference potential such as ground. The potential on the second terminal of the resistance 72 is also introduced to the input terminal of an output stage such as an oscillator 76. The oscillator 76 may be constructed to produce a variable frequency in accordance with the value of the potential introduced to its input terminal. It should be appreciated that the oscillator 76 is included only by way of illustration and that any other stage may be used which produces an output individually responsive to the level of the input potential introduced to it.

The movable arm of the switch 60 is spring loaded in a conventional manner so as to be normally positioned against the upper stationary contact in FIGURE 4. The engagement between the movable arm and lower stationary contact of the switch 60 in FIGURE 4 is controlled by the energizing of a relay 80. The lower stationary contact of the switch 60 in FIGURE 4 is connected to the first terminal of a resistance 82 having a relatively high value in comparison to other impedances in FIGURE 4. The second terminal of the resistance 82 is disposed electrically to receive a calibration voltage from a source 84.

The operation of the system shown in FIGURES 1 to 4, inclusive, may perhaps be seen from a discussion of the simplified diagram shown in FIGURE 5. In this diagram, a rotary switch 100 is provided with a movable arm and a plurality of stationary contacts which are sequentially engaged by the movable arm. The rotary switch 100 may be considered to schematically represent the operation of certain structure including the tracks 30 and 32 and the associated brushes 14 and 16 in FIGURE 4. Because of this, each of the stationary contacts in the rotary switch 100 may be considered as being connected to a different transducer such as the transducers 44a, 44b, 44c in FIGURE 4. The potential on the movable arm of the switch 100 is introduced to the input terminal of a buffer amplifier such as the amplifier 58 in FIGURE 4.

The output from the amplifier 58 passes to the movable arm of a single-pole, single-throw switch 102 which is produced as a result of the operation of certain structure in FIGURES 1 to 4, inclusive. This structure includes the tracks 34 and 36 and the associated brushes 18 and 20. The stationary contact of the switch 102 is connected to the first terminal of a resistance such as the resistance 72 in FIGURE 4, this connection being made in a manner similar to that shown in FIGURE 4.

The potential on the second terminal of the resistance 72 is applied to the output stage such as the oscillator 76 in FIGURE 4. The potential on the second terminal of the resistance 72 is also applied to the stationary contact of a switch 104 having its movable arm connected to the reference potential such as ground. The switch 104 is also effectively produced as a result of the operation of certain structure in FIGURES 1 to 4, inclusive, including the tracks 38 and 40 and the associated brushes 22 and 24. The switch 104 is effectively synchronized in operation with the switches 100 and 102, as will be described in detail subsequently.

The rotary switch 100 schematically illustrates the operation of the tracks 30 and 32 on the disc 26 and the operation of certain electrical circuitry associated with these tracks in FIGURE 4. Because of this, the rotary switch 100 engages such stationary contact in the switch for a period of time before advancing to the next stationary contact of the switch. At one particular instant, for example, the movable arm of the rotary switch 100 may be engaging the stationary contact which is coupled electrically to the transducer 44a. At such a time, the switch 102 may be closed and the switch 104 may be open so that the voltage from the transducer 44a becomes amplified by the stage 58 for introduction to the oscillator 76.

As a first step in the sequence of operations, the switch 102 becomes opened after the potential from the transducer 44a has been introduced to the oscillator 76 for a sufficient period of time to provide a determination as to this potential. The switch 102 becomes opened while the movable arm of the switch 100 is still engaging the contact associated with the transducer 44a. Since the switch 102 is now opened, the output stage such as the oscillator 76 cannot provide a further response to the potential from the transducer 44a.

At a subsequent time, the switch 104 becomes closed such that a short circuit is produced at the input terminal to the oscillator 76. This causes the reference potential such as ground to be introduced to the oscillator 76 for the operation of the oscillator 76 in a manner corresponding to the introduction of a zero potential from one of the transducers. Thereafter, the switch 102 becomes closed at a time at which the movable arm of the switch 100 is still engaging the stationary contact coupled to the transducer 44a.

The closure of the switch 102 after the closure of the switch 104 produces no transient effects in the operation of the oscillator 76. This results from the short circuit to ground previously established at the input terminal to the oscillator 76 by the closure of the switch 104. If the switch 104 were not closed at this time, variations in impedance resulting from the bounce and chatter of the movable arm in the switch 102 upon the closure of the switch might affect the response of the oscillator 76.

After the switch 102 has become closed, the movable arm of the switch 100 advances into engagement with the particular stationary contact which is electrically coupled to the transducer 44b. Because of this advance in the movable arm of the switch 100, transient effects in the impedance between the movable arm and the stationary contact may occur. These transient changes in impedance result from the bounce or chatter of the movable arm of the switch 100 as it engages the stationary contact which is coupled to the transducer 44b. However, the transient effects cannot be introduced to the oscillator 76 because of the short circuit to ground produced at the input terminal to the oscillator 76 by the closure of the switch 104.

Upon the disappearance of the transient effects described in the previous paragraphs, the switch 104 becomes opened. Since the short circuit at the input terminal to the output stage such as the oscillator 76 is now eliminated, the potential from the transducer 44b becomes introduced to the oscillator to control the response of the oscillator.

The sequence described in the previous paragraphs is repeated every time that the movable arm of the switch 100 advances from one stationary contact to the next for a determination as to the potential from the transducer associated with the next stationary contact. In this way, the potential of each transducer is determined upon the opening of a switch such as the switch 104, which shunts the input terminal to the output stage such as the oscilator 76.

In the previous systems, a test as to each transducer potential has been made upon the closure of a switch in series with the output stage such as the oscillator 76. Since the operation of the output stage of the previous systems has been affected by the chatter resulting from the closure of the series switch, the operation of the system constituting this invention is considerably more advantageous than that of the previous systems.

The sequential operation of the switches shown in FIGURE 5 also has certain other advantages. The termination of a test as to the potential of each transducer is made by the opening of a series switch such as the switch 102. This constitutes an instantaneous interruption in the test since no chatter or bouncing of switch contacts is produced upon the opening of a switch such as the switch 102. Thereafter, the shunting switch 104 is closed to short circuit the input to the output stage such as the oscillator 76. Because of this shunt, the switch 102 can now be closed and the movable arm of the rotary switch 100 can be advanced into engagement with the next stationary contact without any fear of transient effects in the response of the oscillator 76. Furthermore, no transient effects are produced in the final step of opening the switch 104 for the same reasons as described above for the switch 102.

It should be appreciated that the sequence described above can be modified without departing from the scope of the invention. For example, the advance of the movable arm of the rotary switch 100 from the stationary contact associated with the transducer 44a can be initiated either before, at the same time or after the closure of the switch 104 provided that the switch 102 is opened at this time. Thus, in the embodiment shown in FIGURES 1 to 4, inclusive, the movable arm of the rotary switch 100 leaves the stationary contact associated with the transducer 44a at the same time that the switch 104 becomes closed. By way of further illustration, the movable arm of the switch 100 can reach the stationary contact associated with the transducer 44b either before, at the same time or after the switch 102 becomes closed, provided that the switch 104 is still closed at this time.

The operation of the multiplexing system shown in FIGURES 1 to 4, inclusive, will now be described with the operation of the simplified system shown in FIGURE 5 as background information. At a particular instant, the brushes 14 and 18 may be respectively engaging the conductive segments 42a and 62a in the tracks 30 and 34. At the same time, the brush 22 may be engaging the isolated portion in the track 38 between the conductive segments 70a and 70b. In this position of the brush 22, the ground potential on the track 40 cannot be introduced through the brushes 24 and 22 to the input terminal of the oscillator 76. This corresponds to the opened state of operation of the switch 104 in FIGURE 5.

Since the brush 14 is engaging the conductive portion 42a, a continuous circuit is established which includes the transducer 44a, the conductive segment 42a in the track 30, the brushes 14 and 16, the conductive segment 54 in the track 32, and the upper stationary and movable contacts of the switch 60. This causes the potential from the transducer 44a to be introduced to the stage 58 for amplification by that stage, such potential being illustrated at 106 in FIGURE 6. The amplified signals then pass to the conductive segments in the track 34, including the conductive segment 62a. The amplified potential is introduced from the segment 62a through the brushes 18 and 20, the track 36 and the resistance 72 to the input terminal of the output stage such as the oscillator 76, as illustrated at 108 in FIGURE 6. In this way, the operation of the oscillator 76 is controlled by the potential from the transducer 44a. This corresponds to the state of operation in which the switch 102 in FIGURE 5 is closed and the switch 104 in that figure is opened.

As the brushes including the brush 18 move toward the right in FIGURE 4, a discontinuity is first produced as the brush 18 engages the electrically isolated portion 63b. This causes the circuit from the output of the amplifier 58 to the output stage such as the oscillator 76 to become interrupted. This corresponds to the opening of the switch 102 in FIGURE 5. Since the switch 102 is now opened, no potential is introduced to the resistor 72, as indicated at 110 in FIGURE 6. Furthermore, no input signal is introduced to the oscillator 76, as indicated at 112 in FIGURE 6.

Upon a further advance of the brushes 14, 16, 18, 20, 22 and 24, the brush 14 moves from the conductive segment 42a to the isolated portion 43b. This corresponds to an advance of the movable arm in the switch 100 from the stationary contact coupled to the transducer 44a into the space between that stationary contact and the stationary contact coupled to the transducer 44b. At such a time, no potential can be introduced to the buffer amplifier 58 as indicated at 114 in FIGURE 6.

At approximately the same time that the brush 14 moves into the isolated portion 43b in the track 30, the brush 22 engages the conductive segment 70b in the track 38. This causes a continuous circuit to be established which includes the reference potential such as ground, the track 40, the brushes 24 and 22 and the conductive segment 70b such that the ground potential is introduced to the input terminal of the oscillator 76. The introduction of the ground potential to the input terminal of the oscillator 76 is indicated schematically in FIGURE 6 by the solid bars 116. It corresponds to the closure of the switch 104 in FIGURE 5.

After the switch corresponding to the switch 104 in FIGURE 5 has become closed, the brush 18 advances into engagement with the conductive segment 62b in the track 34. This corresponds to a closure of the switch 102 in FIGURE 5, such that a continuous circuit is established from the output of the amplifier 58 to the input terminal of the output stage, such as the oscillator 76. This may cause a fixed potential to be introduced from the buffer amplifier 58 as illustrated at 118 in FIGURE 6. The fixed potential is produced even though the brush 14 is still moving at this time through the isolated portion 43b such that no input potential can be introduced as yet from the transducer 44b to the amplifier 58.

The fixed potential 118 is produced at this time because of the bias characteristics applied to the amplifier 58. It should be appreciated, however, that a zero potential rather than the positive potential 118 can be produced at this time without departing from the true nature of the invention. Even though the positive potential is produced at this time, the potential of zero amplitude is still introduced to the input terminal to the oscillator 76 because of the closure of the switch corresponding to the switch 104 in FIGURE 5.

A further advance of the brush 14 along the track 30 causes the brush to engage the conductive segment 42b. At this time, a continuous circuit is established which includes the transducer 44b, the conductive segment 42b, the brushes 14 and 16, the conductive segment 54 in the track 32, and the upper stationary contact and movable arm of the switch 60. Because of this continuous circuit, a potential 120 in FIGURE 6 is introduced from the transducer 44b to the stage 58 for amplification. However, even though the switch corresponding to the switch 102 in FIGURE 5 is closed, the potential from the transducer 44b cannot be introduced to the output stage such as the oscillator 76 because of the closure of the switch corresponding to the switch 104 in FIGURE 5. This causes the potential 112 of zero volts to be introduced to the oscillator 76 even though the potential 120 representing the value of the parameter from the transducer 44b is now introduced to the amplifier 58.

At a subsequent time, the brush 22 advances along the track 38 to a position in engagement with the isolated portion between the conductive segments 70b and 70c. At this time, the ground potential on the track 40 can no longer be introduced to the input terminal of the output stage such as the oscillator 76. This corresponds to an opening of the switch 104 in FIGURE 5. At this time, the brush 18 is still disposed in coupled relationship with the conductive segment 62b so as to maintain the closure of the switch corresponding to the switch 102 in FIGURE 5. The brush 14 is also positioned in coupled relationship with the conductive segment 42b in the track 30 so as to obtain an electrical coupling between the transducer 44b and the input to the amplifier 58.

Because of the electrical relationships described in the previous paragraph, the potential from the transducer 44b is introduced on an amplified basis to the oscillator 76 to control the operation of the oscillator. This is indicated at 122 in FIGURE 6. The input potential 122 to the oscillator 76 represents an addition of the potential 120 from the transducer 44b and the potential 118 which is produced by the amplifier 58 even upon the introduction of a zero potential to the amplifier.

At certain times in each revolution of the brush holder 12, the brushes 14, 16 and 18 respectively engage the conductive segments 46, 56 and 66. At such times, a voltage is applied from the source 52 through a circuit which includes the resistance 50, the conductive segment 46, the brushes 14 and 16 and the conductive segment 56. This voltage is amplified in a manner described above and is applied in amplified form to the output stage such as the oscillator 76. The resultant signals produced by the oscillator 76 provide a synchronous operation in each revolution of the brush holder 12 such that signals at a pre-determined frequency dependent upon the potential from the source 52 are produced by the oscillator. The signals are preferably produced for a relatively long period of time in comparison to the signals obtained from each of the particular transducers such as the transducers 44a, 44b, 44c etc.

At certain times, it may be desired to calibrate the operation of various stages including the buffer amplifier 58 and the oscillator 76. During such periods of calibration, the relay coil 80 is energized to actuate the movable arm of the switch 60 into engagement with the lower stationary contact of the switch in FIGURE 4. This causes a continuous circuit to be established to the buffer amplifier 58, such circuit including the voltage source 84, the resistance 82 and the lower stationary contact and movable arm of the switch 60. This circuit is established during the times that the brush 14 is engaging the conductive segments 42a, 42b, 42c, etc. Because of this, the oscillator 76 produces signals at the same frequency during the activation of each of the segments 42a, 42b, 42c, etc. regardless of the potentials from the transducers 44a, 44b, 44c, etc.

When the brushes 14, 16 and 18 are respectively contacting the conductive segments 46, 56 and 66 during the calibration period, the potential from the source 52 controls the operation of the amplifier 58 and the oscillator 76 even though a continuous circuit is established to the amplifier from the voltage source 84. This results from the fact that the impedance between the voltage source 52 and the buffer amplifier 58 is considerably less than the impedance between the voltage source 84 and the buffer amplifier. The impedance between the voltage source 84 and the buffer amplifier 58 is relatively high because of the particular value chosen for the resistance 82.

The resistance 72 constitutes a protective impedance to prevent the buffer amplifier 58 from becoming overloaded and overheated when the buffer amplifier 58 is grounded through a circuit including the conductive segments in the track 34, the track 36, the resistance 72, the conductive segments in the track 38 and the track 40. The resistance 74 is provided with a relatively low impedance such that the distributive capacity between different wires is able to discharge through the resistance. The resistance 74 also has a relatively low value so that the ground potential can be established at the input terminal of the oscillator 76 as described above.

It should be appreciated that the tracks 30, 32, 34, 36, 38 and 40 do not necessarily have to have an annular configuration. For example, the tracks may also have a linear disposition and the brushes 14, 16, 18, 20, 22 and 24 may be movable in the linear direction along the tracks. It should also be appreciated that the tracks do not necessarily have to be provided with electrically insulated portions such as the portions 43a in the track 30. By way of illustration, the track 30 may be provided with a continuously conductive configuration and may be indented at the spaces corresponding to the electrical insulated portions 43a, 43b, 43c, etc. By indenting the portions 43a, 43b, 43c, etc., the brush 14 becomes separated from these portions so that electrical continuity cannot be established from the track 30 to the brush as the brush moves past the portions 43a, 43b, 43c, etc.

The embodiment shown in FIGURE 7 performs functions similar to that described previously for the embodiment shown in FIGURES 1 to 4, inclusive, even though it is constructed somewhat differently from the embodiment shown in FIGURES 1 to 4, inclusive. The embodiment shown in FIGURE 7 includes a pair of tracks generally indicated at 200 and 202 which may be disposed in spaced and parallel relationship to each other on a disc (not shown) or other suitable member. The track 202 has a pair of conductive portions 204 and 206 separated from each other by electrically insulated portions 208 and 209 of relatively short length. The conductive segment 204 may have a length corresponding to that of the conductive segments 46, 56 and 66 in FIGURE 4 and performs similar functions.

The track 200 has a conductive segment 210 which is disposed in aligned relationship with the segment 204 and which is provided with a length corresponding to that of the segment 204. The track 200 also includes a first plurality of conductive segments 212a, 212b, 212c, etc. all preferably of equal lengths. The segment 212a is disposed in contiguous relationship to the segment 210 and is separated from the segment 210 by an electrically insulated portion 214a. The track 200 also includes a plurality of conductive segments 216a, 216b, 216c, etc. These segments are provided with lengths corresponding to the lengths of the segments 212a, 212b, 212c, etc. and are separated from the segments 212a, 212b, 212c, etc. by electrically insulated portions 218a, 218b, 218c, etc.

The track 200 further includes a plurality of conductive segments 220a, 220b, 220c, etc. These segments are provided with equal lengths which are preferably somewhat greater than those provided for the segments 212a, 212b, 212c, etc. The segments 220a are disposed between pairs of the segments 212a, 212b, 212c, etc. and the segments 216a, 216b, 216c. For example the conductive segment 220a is disposed between the segment 216a and the segment 212b.

A brush holder generally indicated at 224 is movable along the tracks 200 and 202 such as in a direction indicated by an arrow 226 in FIGURE 7. The brush holder includes a first pair of brushes 228 and 230 which are constructed to establish point contacts with the track 200. This brushes 228 and 230 are so disposed relative to each other that the brush 230 contacts the track 200 at a position slightly ahead of the brush 228 in the direction of movement of the brushes. Similarly, a pair of brushes 232 and 234 contact the track 204 at positions corresponding to the respective positions of the brushes 228 and 230 on the track 200. The brushes 228, 230, 232 and 234 have a common electrical connection.

The conductive segments 220a, 220b, 220c, etc., are respectively coupled to electrical transducers 238a, 238b, 238c, etc. corresponding to the transducers 44a, 44b, 44c, etc. in FIGURE 4. The conductive segment 210 is coupled to a voltage source 240 in a manner similar to that described above for the coupling between the conductive segment 46 and the voltage source 52 in FIGURE 4. The conductive segments 212a, 212b, 212c, etc. have a common connection with a line 242, and the conductive segments 216a, 216b, 216c, etc. extend electrically to a line 244.

The conductive segment 204 has a common connection with the movable arm of a single-pole single-throw switch 248 and with the upper stationary contact in FIGURE 7 of a single-pole double-throw switch 250. The stationary contact of the switch 248 receives a calibration potential from a source 252 corresponding to the source 84 in FIGURE 4. The movable arm of the switch 250 is connected to the conductive segment 206 in the track 202, and the lower stationary contact of the switch 250 in FIGURE 7 is connected to a reference potential such as ground.

The upper stationary contact of a single-pole double-throw switch 254 in FIGURE 7 extends electrically to the reference potential such as ground, and the movable arm of the switch has a common connection with the line 244. The lower stationary contact of the switch 254 and the stationary contact of a single-pole single-throw switch 256 are connected to the input terminal of an output stage such as an oscillator 258. The oscillator 258 corresponds to the oscillator 76 in FIGURE 4. The movable arm of the switch 256 is connected to the line 242.

The oscillator 258 is connected to one terminal of a resistance 260 corresponding to the resistance 74 in FIGURE 4, the ground terminal of the resistance being connected to the reference potential such as ground. The oscillator 258 is also connected to receive the potential from a buffer amplifier 262 corresponding to the buffer amplifier 58 in FIGURE 4. The input terminal of the amplifier 262 has a potential applied to it from the conductive segment 204 in the track 202.

The movable arms of the switches 248, 250, 254 and 256 are spring loaded so as to be normally disposed in the positions shown in FIGURE 7. The movable arms of the switches 248, 250, 254 and 256 are pivotable downwardly in FIGURE 7 into engagement with the lower stationary contacts of the switches in that FIGURE when a relay coil 266 is energized.

At a particular instant, the brushes 228 and 230 and the brushes 232 and 234 may be respectively engaging particular conductive segments such as the segment 220a in the track 200 and the segment 206 in the track 202. This causes a continuous circuit to be established which includes the transducer 238a, the conductive segment 220a, the brushes 228, 230, 232 and 234, the conductive segment 206, the movable arm and upper stationary contact of the switch 250 in FIGURE 7 and the buffer amplifier 262. Because of this continuous circuit, the oscillator 258 produces signals at a frequency related to the potential from the transducer 230a.

As the brushes 228, 230, 232 and 234 move to the right in FIGURE 7, the brushes 228 and 230 and the brushes 232 and 234 respectively engage the conductive segment 212b in the track 200 and the conductive segment 206 in the track 202. Since the conductive segment 212b is connected to the movable arm of the switch 256 and since the switch is open, no continuity can be established from either the transducer 238a or the transducer 238b to the buffer amplifier 262. This corresponds to the opening of the switch 102 in FIGURE 5.

Upon a further movement of the brushes 228, 230, 232 and 234 toward the right in FIGURE 7, the brushes engage the conductive segment 216b in the track 200 and the conductive segment 206 in the track 202. At such a time, a continuous circuit is established which includes the reference potential such as ground, the upper stationary contact and movable arm of the switch 254 in FIGURE 7, the line 244, the conductive segment 216b, the brushes 228, 230, 232 and 234, the conductive segment 206, the movable arm and upper stationary contact of the switch 250 in FIGURE 7 and the buffer amplifier 262. This corresponds to a closure of the switch 104 in FIGURE 5 and prevents a potential from any of the transducers including the transducer 238b from being effectively introduced to the amplifier.

When the brushes 228, 230, 232 and 234 move through a further distance, an overlap between the conductive segments 216b and 220b is obtained whereby the brush 228 engages the segment 216b at the same time that the brush 230 engages the segment 220b. This causes a ground potential to be produced on the input terminal to the amplifier 262 at the same time that a continuous circuit is established between the transducer 238b and the amplifier.

Since the circuit from ground to the input terminal of the amplifier 262 has a lower impedance than the circuit from the transducer 238b to the input terminal of the amplifier, the ground potential at the input terminal predominates. This corresponds to the simultaneous closure of the switches 102 and 104 in FIGURE 5. A further movement of the brushes 228 and 230 causes the brush 228 to leave the conductive segment 216b so that the amplifier 262 now receives the potential from the transducer 238b.

In this way, a sequence is established by the track arrangement and associated circuitry of FIGURE 7 in a manner similar to that established by the track arrangement and associated circuitry of FIGURE 4. In the arrangement shown in FIGURE 7, an open circuit is obtained at the end of a measurement and then a shunting switch is closed. The shunting switch remains closed until after the circuit from the next transducer to the amplifier has been completed.

A synchronizing operation is obtained in each repetitive movement of the brush holder 224 through a complete path. This synchronizing operation is obtained during the time that the brushes 228 and 230 and the brushes 232 and 234 are respectively engaging the conductive segments 210 and 204 in the tracks 200 and 202. At such a time, the potential from the voltage source 240 controls the operation of the buffer amplifier 262 and the frequency of the signals produced by the oscillator 258.

At certain times, it may be desired to calibrate the operation of the system shown in FIGURE 7. This is obtained by energizing the coil 266 so that the switches 248 and 256 become closed and so that the movable arms of the switches 250 and 254 engage the lower stationary contacts of the switches in FIGURE 7. At such a time, a continuous circuit is established to the buffer amplifier 262 through the switch 248 from the voltage source 252.

During the time that the brushes 228 and 230 are engaging the conductive segments 212a, 212b, 212c, etc., in the "calibrate" mode of operation, the output of the amplifier 262 is grounded. This grounding is obtained through a circuit which includes the switch 256, the line 242, one of the conductive segments 212a, 212b, 212c, etc., the brushes 228, 230, 232 and 234, the conductive segment 206 and the movable arm and the lower stationary contact of the switch 250. The output from the amplifier 262 is also grounded through the switch 254 and the line 244 during the time that the brushes are engaging the conductive segments 216a, 216b, 216c, etc.

Since the calibration potential from the source 252 is effective to control the oscillator 258 during the movements of the brushes 228 and 230 along the conductive portions 220a, 220b, 220c, etc., an effective chopping action between ground and the calibration potential is obtained during the calibration periods. This transition between the calibration potential and ground in successive periods is instrumental in determining whether the circuitry including the buffer amplifier 262 and the oscillator 258 is functioning properly.

As will be seen, the system shown in FIGURE 7 operates in a manner similar to that shown in FIGURES 1 to 4, inclusive, even though it includes less tracks than the systems shown in FIGURES 1 to 4, inclusive. This results from the inclusion of pairs of brushes for each of the tracks shown in FIGURE 7 and from the displaced relationship of the brushes in each pair in the direction of movement of the tracks.

Figure 8:
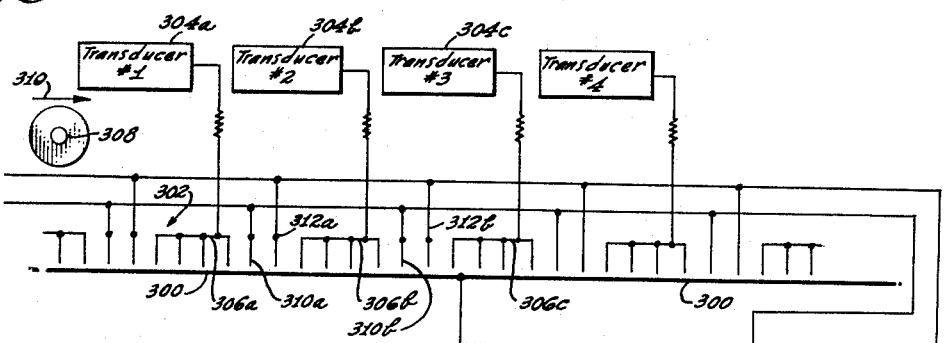
FIGURE 8 is a fragmentary developed view of a third embodiment of the invention and includes a schematic showing of tracks on a disc and a wheel for sequentially activating successive positions on the tracks and further illustrates electrical circuitry associated with the different tracks to obtain a desired test of the different parameters on a multiplexing basis.
Figure 9:
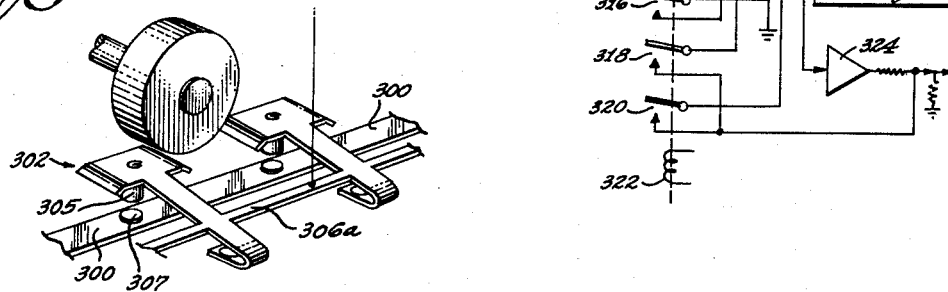
FIGURE 9 is an enlarged fragmentary perspective view of the tracks shown in FIGURE 8 and of the wheel movable along the track to activate successive positions on the tracks.

The embodiment shown in FIGURES 8 and 9 also operates in a similar manner to that described above for the previous embodiments even though constructed somewhat differently from the previous embodiments. The embodiment shown in FIGURES 8 and 9 includes a first track 300 made from a conductive material and having a continuous configuration such as in a closed loop. The embodiment also includes a second track generally indicated at 302 which may be formed from a plurality of movable fingers. The fingers are shown somewhat schematically in FIGURE 8 and are spring-loaded to be positioned out of engagement with the track 302. The fingers in the track 300 may be made from a conductive material having flexible properties such that they can be moved individually into engagement with the track 300 to establish electrical continuity with the track. For example, the fingers may be pivotable into engagement with the track 300 as shown in FIGURE 9 and may be provided with contacts 305 which are movable into engagement with a corresponding contact 307 on the track 300.

Groups of fingers in the track 302 are electrically associated with different transducers such as transducers 304a, 304b, 304c, etc., corresponding to the transducers 44a, 44b, 44c, etc., in FIGURE 4. By way of illustration, adjacent fingers 306a in a first group may be electrically coupled to the transducer 304a and adjacent electrical fingers 306b in a second group may be electrically associated with the transducer 304b. The fingers such as the fingers 306a and 306b are individually and sequentially moved into engagement with the track 300 in accordance with the movement of a member such as a rotatable wheel 308 along the track. The wheel 308 is movable in a direction indicated by an arrow 310 in FIGURE 8 and is made from a material having properties of electrical insulation.

Individual fingers are disposed between the fingers in the successive groups which are electrically coupled to the different transducers. For example, a finger 310a may be disposed between the fingers 306a and 306b, and a finger 310b may be disposed between the fingers 306b and fingers 306c. In like manner, a finger 312a is disposed between the fingers 310a and the fingers 306b, and a finger 312b is disposed between the finger 310b and the fingers 306c.

The track 300 is connected to the upper stationary contact of a single-pole, double-throw switch 314 and to the lower stationary contact of a single-pole, double-throw switch 316. Connections are made from the fingers 312a, 312b, 312c, etc., to the upper stationary contact of the switch 316 and to the movable arm of a single-pole, single-throw switch 318. Similarly, the fingers 310a, 310b, 310c, etc., have a common connection with the movable arm of a single-pole, single-throw switch 320. The movable arms of the switches 314, 316, 318 and 320 are spring-loaded for a positioning of the arms as shown in FIGURE 8 and are pivotable downwardly in FIGURE 8 upon an energizing of a relay coil 322. The movable arm of the switch 314 is connected to the input terminal of a buffer amplifier 324 corresponding to the amplifier 58 in FIGURE 4, and the output signals from the amplifier are applied to the stationary contacts of the switches 318 and 320.

At a particular instant, the wheel 308 may be depressing one or more of the fingers 306a into engagement with the track 300. This causes a continuous circuit to be established which includes the transducer 304a, the fingers 306a, the track 300, the upper stationary contact and movable arm of the switch 314 and the buffer amplifier 324. Because of this, the buffer amplifier 324 produces a potential related to the potential from the transducer 304a.

At a later time, the wheel 308 leaves the fingers 306a and engages the finger 310a. Since the switch 320 is open, no potential is now applied to the input terminal of the amplifier 324. The wheel 308 subsequently moves into position to depress the finger 312a into engagement with the track 300. This causes a continuous circuit to be established which includes the reference potential such as ground, the movable arm and upper stationary contact of the switch 316, the finger 312a, the track 300, the upper stationary contact and movable arm of the switch 314 and the amplifier 324. Because of this, a ground potential is applied to the amplifier 324 to control the operation of the amplifier. This corresponds to a closure of the switch 104 after an opening of the switch 102 in FIGURE 5.

As the wheel 308 continues to move along the track 302, it subsequently obtains a simultaneous depression of the fingers 312a and the first one of the fingers 306b. At such a time, a continuous circuit is established from the transducer 304b to the buffer amplifier 324. However, this potential cannot affect the operation of the amplifier 324 since the amplifier is still receiving the ground potential through the finger 312a and the track 300. This corresponds to a simultaneous closure of the switches 102 and 104 in FIGURE 5. Upon a subsequent rotation of the wheel 308, the wheel leaves the finger 312a so as to engage only the first one of the fingers 306b. This causes the potential from the transducer 304b to control the operation of the amplifier 324 and corresponds to an opening of the switch 104 in FIGURE 5.

The relay coil 322 is energized when it is desired to calibrate the operation of the system shown in FIGURE 8. At such a time, the switches 318 and 320 become closed and the switches 314 and 316 become pivoted into engagement with the lower stationary contact of the switches in FIGURE 8. During the movement of the insulated wheel 308 along the groups of the fingers such as the fingers 306a and 306b, a calibration potential is applied from the source 326 through the switch 314 to control the operation of the amplifier 324. However, the output of the amplifier 324 becomes grounded through either one of the switches 318 and 320 and the switch 316 when the movable wheel is engaged by one of the fingers 310a, 310b, 310c, etc., or one of the fingers 312a, 312b, and 312c, etc. This causes the output of the amplifier 324 to vary between the calibration potential and ground on a cyclic basis so that the proper operation of the amplifier and of successive stages such as the oscillators shown in FIGURES 4 and 7 can be determined.

Figure 10:
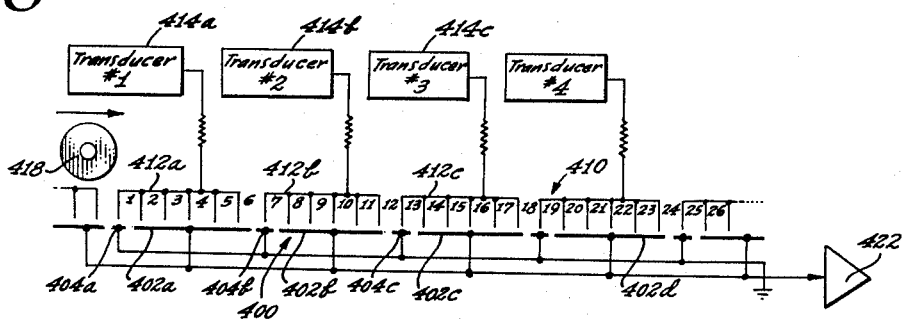
FIGURE 10 is a fragmentary developed view of apparatus constituting a fourth embodiment of the invention.

The embodiment shown in FIGURE 10 is somewhat similar to the embodiment shown in FIGURES 8 and 9 in that it includes a plurality of fingers disposed above a track generally indicated at 400. However, instead of having a contiguous configuration as the corresponding track in FIGURE 8, the track 400 in FIGURE 9 is provided with a plurality of conductive segments. These include first conductive segments 402a, 402b, 402c, etc., each of which has a length corresponding to that of several adjacent fingers. The track 400 also includes a plurality of conductive segments 404a, 404b, 404c, etc., which are disposed in alternate and electrically isolated relationship with respect to the segments 402a, 402b, 402c, etc. Each of the segments 404a, 404b, 404c, etc., is provided with a length corresponding to that of one finger.

The embodiment shown in FIGURE 10 also includes a track generally indicated at 410 and having a plurality of conductive fingers which are disposed above the track 400 in a manner similar to that described above for the embodiment shown in FIGURE 8. The fingers in the plurality are divided into groups such as 412a, 412b, 412c, etc. The fingers in each group such as the group 412a are disposed in adjacent relationship to one another and are electrically coupled to a different transducer. For example, the groups of fingers 412a, 412b, 412c, etc., are respectively coupled electrically to transducers 414a, 414b, 414c, etc., which correspond to the transducers 44a, 44b, 44c, etc., in FIGURE 4. The fingers in the track 410 are movable into engagement with the track 400 in accordance with the disposition of an insulated wheel 418.

As the wheel engages the fingers 412a which are common to the conductive segment 402a, the potential from the transducer 414a is introduced to a buffer amplifier 422. Upon a further movement of the wheel 418 toward the right in FIGURE 10, the wheel simultaneously depresses the last one of the fingers 412a and the first one of the fingers 412b. This causes a continuous circuit to be established which includes the reference potential such as ground, the conductive segment 404b, the fingers 412b and the conductive segment 402b. Because of this circuit, a ground potential is applied to the input terminal of the buffer amplifier 422 to provide a corresponding control over the operation of the amplifier.

Upon a further rotation of the wheel 418, the wheel engages subsequent ones of the fingers 412b. This causes the ground potential at the input terminal of the amplifier 422 to become interrupted after electrical continuity between the transducer 414b and the input terminal to the amplifier has become assured. In this way, a shunt to ground is obtained at the end of each measurement and initially at the beginning of the next measurement to prevent transient signals from affecting the operation of the amplifier 422.

Although this invention has been disclosed and illustrated with reference to particular applications, the principles involved are susceptible of numerous other applications which will be apparent to persons skilled in the art. The invention is, therefore, to be limited only as indicated by the scope of the appended claim.

What is claimed is:

In combination for providing a sequential test of potentials representing information from a plurality of different channels, a first annular member, a plurality of spaced track disposed in concentric relationship on the annular member, a first group of tracks in the plurality having a continuous configuration and electrically conductive properties and a second group of tracks in the plurality having pluralities of electrically conductive portions disposed in electrically isolated relationship to one another, each of the electrically conductive portions in the tracks of the second group having a particular annular disposition relative to the other conductive portions in the tracks, a plurality of ganged brushes disposed in coupled relationship to the different tracks in the plurality and movable in a rotary direction and coupled electrically to one another in a particular relationship, an output stage coupled electrically to one of the tracks in the first group and to the conductive segments of a first particular one of the tracks in the second group for response in accordance with the potential introduced to the stage, means including electrical circuitry coupled electrically to the conductive segments of a second particular one of the tracks in the second group for introducing the potential from the different channels individually to the conductive segments in the track, means including the conductive portions in the first particular one of the tracks in the second group and a second particular track in the first group for obtaining the introduction of a zero potential to the output stage during a movement of the brushes from the end of each conductive portion in the second particular track in the second group until the beginning of the next conductive portion in the second particular track, and means including the first particular track in the first group and the conductive segments of the second particular track in the second group for obtaining the introduction of the potential from the channels associated with the segments of the second particular track in the second group during the subsequent movement of the brushes along the next conductive segment in the second particular track of the second group.

References Cited in the file of this patent

UNITED STATES PATENTS

| | | |
|---|---|---|
| 2,753,546 | Knowles | July 3, 1956 |
| 2,815,500 | Hance et al. | Dec. 3, 1957 |
| 2,833,862 | Tolson | May 6, 1958 |
| 2,839,737 | Dalglish | June 17, 1958 |
| 2,845,613 | Pawley | July 29, 1958 |